(12) United States Patent
Haller et al.

(10) Patent No.: US 11,359,674 B2
(45) Date of Patent: Jun. 14, 2022

(54) COUPLING HAVING A SHAFT AT LEAST PARTIALLY INSERTED INTO A HOLLOW SHAFT AND A RING PART SLIPPED ONTO THE HOLLOW SHAFT, AND PLANETARY TRANSMISSION

(71) Applicant: SEW-EURODRIVE GMBH & CO. KG, Bruchsal (DE)

(72) Inventors: Sascha Haller, Karlsruhe (DE); Jens Schillinger, Rastatt (DE); Max Denkhaus, Ubstadt-Weiher (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 248 days.

(21) Appl. No.: 16/625,705

(22) PCT Filed: Jun. 11, 2018

(86) PCT No.: PCT/EP2018/025153
§ 371 (c)(1),
(2) Date: Dec. 21, 2019

(87) PCT Pub. No.: WO2018/233875
PCT Pub. Date: Dec. 27, 2018

(65) Prior Publication Data
US 2021/0108682 A1    Apr. 15, 2021

(30) Foreign Application Priority Data

Jun. 22, 2017   (DE) .................. 10 2017 005 891

(51) Int. Cl.
*F16D 1/04*      (2006.01)
*F16D 1/08*      (2006.01)
(52) U.S. Cl.
CPC ............. *F16D 1/04* (2013.01); *F16D 1/0847* (2013.01)

(58) Field of Classification Search
CPC . F16D 4/04; F16D 4/08; F16D 4/0847; F16D 4/0864; F16D 4/09; F16D 4/092;
(Continued)

(56) References Cited

U.S. PATENT DOCUMENTS

| 3,463,520 A | 8/1969 | Turro |
| 9,945,426 B2 | 4/2018 | Kasper |
| 2001/0043768 A1 | 11/2001 | Okamoto |

FOREIGN PATENT DOCUMENTS

| CN | 104053919 A | 9/2014 |
| CN | 204921723 U | 12/2015 |

(Continued)

OTHER PUBLICATIONS

International Preliminary Report on Patentability issued to corresponding application No. PCT/EP2018/025153 dated Jan. 2, 2020.
(Continued)

*Primary Examiner* — Daniel J Wiley
(74) *Attorney, Agent, or Firm* — Carter, DeLuca & Farrell LLP

(57) ABSTRACT

A coupling includes a shaft at least partially inserted into a hollow shaft and a ring part, in particular of a clamping ring, slipped onto the hollow shaft. The ring part is axially restricted by a collar provided on the shaft, in particular a radially projecting collar, and/or the ring part is resting against a collar, or the collar, of the shaft, in particular against a collar provided on the shaft, in particular a radially projecting collar. The hollow shaft has slots, in particular axial slots, which are set apart from the collar. The ring part has a chamfer, in particular on its inner side and/or at its ring opening and/or in particular in its axial end region facing the collar, so that the inner diameter of the ring part in the axial region covered by the chamfer is greater than the inner diameter in the particular axial region in which the ring part is in contact with the hollow shaft. The ring part has a
(Continued)

radially uninterrupted threaded bore into which a screw part, in particular a set screw and/or a threaded pin, is screwed, which exerts pressure on the hollow shaft.

23 Claims, 10 Drawing Sheets

(58) Field of Classification Search
CPC . F16D 1/04; F16D 1/08; F16D 1/0847; F16D 1/0864; F16D 1/09; F16D 1/092
See application file for complete search history.

(56) References Cited

FOREIGN PATENT DOCUMENTS

| | | |
|---|---|---|
| DE | 102004011361 B3 | 7/2005 |
| DE | 102013100129 A1 | 7/2014 |
| DE | 102014007063 A1 * 11/2014 | ........... F16D 1/0847 |
| DE | 202013105568 U1 | 3/2015 |
| EP | 3006741 A1 | 4/2016 |

OTHER PUBLICATIONS

International Search Report dated Sep. 18, 2018, in International Application No. PCT/EP2018/025153 English-language translation).

Chinese Office Action issued in corresponding CN Application No. 201880041453.5, dated Sep. 3, 2021, pp. 1-8.

* cited by examiner

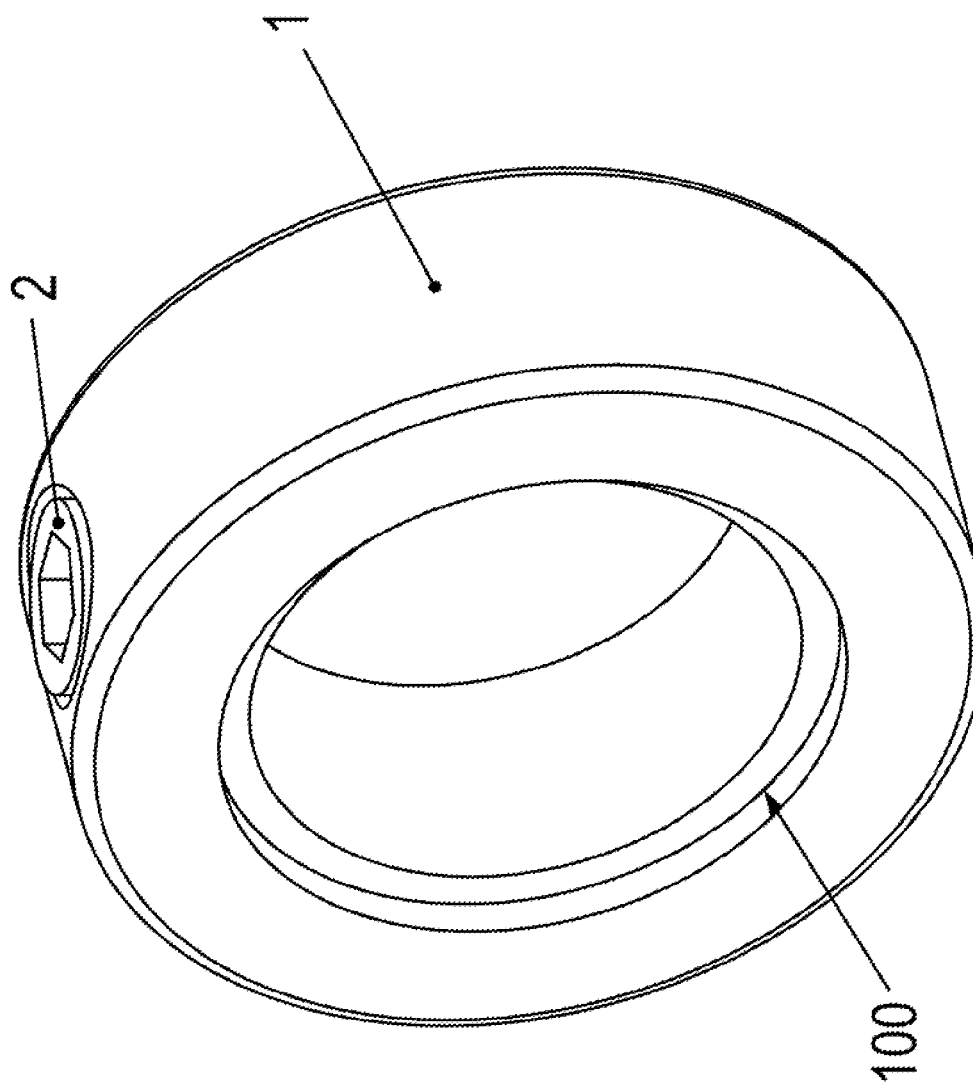

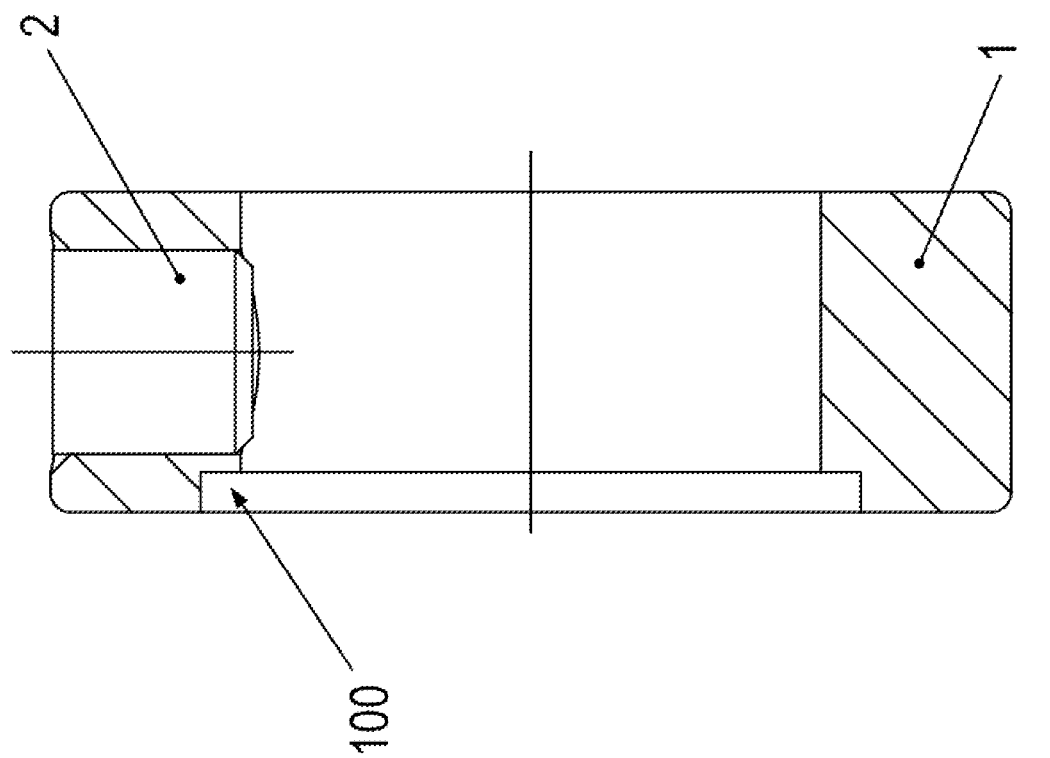

COUPLING HAVING A SHAFT AT LEAST PARTIALLY INSERTED INTO A HOLLOW SHAFT AND A RING PART SLIPPED ONTO THE HOLLOW SHAFT, AND PLANETARY TRANSMISSION

FIELD OF THE INVENTION

The present invention relates to a coupling having a shaft at least partially inserted into a hollow shaft and a ring part slipped onto the hollow shaft, and a planetary transmission.

BACKGROUND INFORMATION

According to certain conventional arrangements, in the case of a clamping ring, a nonpositive coupling is able to be produced with the aid of a ring part.

SUMMARY

Example embodiments of the present invention provide a coupling, which is able to be used on the rapidly rotating, i.e. input, side of a planetary transmission.

According to an example embodiment of the present invention, a coupling has a shaft which is at least partially inserted into a hollow shaft and a ring part, in particular of a clamping ring, which is slipped onto the hollow shaft. The ring part is axially restricted by a collar, which is provided on the shaft and in particular is a radially projecting collar, and/or the ring part is resting against a collar, or the collar, of the shaft, in particular against a collar provided on the shaft, in particular a radially projecting collar. The hollow shaft has slots, in particular axial slots, which are set apart from the collar, and the ring part has a chamfer, in particular on its inner side and/or at its ring opening and/or in particular at its axial end region facing the collar, so that the inner diameter of the ring part in the axial region covered by the chamfer is greater than the inner diameter in the particular axial region in which the ring part is in contact with the hollow shaft. The ring part has a radially uninterrupted threaded bore into which a screw part, in particular a set screw and/or threaded pin, is screwed, which exerts pressure on the hollow shaft.

This is considered advantageous insofar as the coupling is balanced. This is so because the ring part together with the screw part is substantially rotationally symmetric, i.e., balanced. In addition, only little mass is required to manufacture the ring part. The nonpositive coupling is effectively obtained by tightening the screw part and the thereby induced shrinking of the ring part onto the hollow shaft. As a result, a high coupling torque is able to be achieved that requires only a small outlay in terms of mass.

According to example embodiments, the radial width of the ring part is independent of the circumferential angle. This is considered advantageous insofar as it makes the production uncomplicated. No separate production method step has to be carried out for the balancing.

According to example embodiments, the screw part exerts pressure on a flattened region of the hollow shaft, i.e., a flattened, in particular planar region on the outer side of the hollow shaft. This offers the advantage that the contact conditions between the screw part and hollow shaft are well defined.

According to example embodiments, the axial region covered by the region of the shaft inserted into the hollow shaft overlaps with the axial region covered by the ring part. This is considered advantageous insofar as the hollow shaft is able to be shrunk onto the shaft inserted into the hollow shaft.

According to example embodiments, the hollow shaft has a slotted region which includes the slots. This has the advantage that the hollow shaft is more elastic in the slotted region than in the other region.

According to example embodiments, the slots of the hollow shaft are set apart from one another at regular intervals in the circumferential direction. This is considered advantageous insofar as it allows for an uncomplicated production. Moreover, the flattened region may be positioned diametrically across from one of the slots on the hollow shaft.

According to example embodiments, the slots extend radially through the hollow shaft, in particular through the wall of the hollow shaft without interruption, and/or have an axial alignment. This offers the advantage that high elasticity is achievable.

According to example embodiments, the number of slots is three or higher. This is considered advantageous insofar as a balanced arrangement of the slots may be obtained, in particular by setting the slots apart at regular intervals in the circumferential direction.

According to example embodiments, the flattened region at the circumference of the hollow shaft is situated diametrically to one of the slots, and/or the center point of the circumferential angular range covered by the flattened region lies at a distance of 180° in the circumferential direction from the center point of the circumferential angular range covered by one of the slots. This has the advantage that a three-point contact is able to be brought about at the circumference of the hollow shaft between the hollow shaft and ring part. In the process, the screw part exerts pressure on the hollow shaft at a first circumferential position. At two circumferential positions, which are separated by the slot disposed on the hollow shaft diametrically across from the first circumferential position, the hollow shaft exerts pressure on the ring part. A three-point contact is therefore provided. In the same manner, the hollow shaft exerts pressure on the shaft that is inserted into it, i.e. in a shrink-fitting manner.

According to example embodiments, the hollow shaft has a constant outer diameter. This offers the advantage that the ring part is able to be set apart from the hollow shaft with the aid of an easily producible chamfer outside the slotted region of the hollow shaft.

According to example embodiments, the axial region covered by the chamfer touches and/or adjoins the axial region covered by the collar. This is considered advantageous insofar as the region adjacent to the collar has no contact area between the ring part and the hollow shaft. As a result, a clearance between the ring part and hollow shaft is provided in this region adjoining the slotted region. The ring part thereby introduces the entire shrink-on force into the slotted region and not into the region axially situated between the collar and the slotted region.

According to example embodiments, the wall thickness and/or the cross-section of the ring part is/are independent of the circumferential angle. This offers the advantage that the balancing is readily obtained by a radial bore.

According to example embodiments, the chamfer is arranged as a conical chamfer or as an arched conical chamfer or as a stepped chamfer. This is considered advantageous since a conical chamfer is readily produced. An arched conical chamfer, on the other hand, provides greater stability because the transition from the region of the chamfer to the rest of the region may be produced so that is optimized in terms of stability. The stepped chamfer, similar to a stepped bore, is able to be produced very readily and cost-effectively, and the spacing of the ring part from the hollow shaft is able to be reliably ensured in the entire region between the collar and slotted region of the hollow shaft.

According to example embodiments, the ring part of the clamping ring has a chamfer on its inner side so that the ring part is set apart from the hollow shaft in the axial region covered by the chamfer, and the axial region covered by the chamfer adjoins a slotted region of the hollow shaft so that the shrink force of the ring part is introduced into the slotted region of the hollow shaft but not into the axial region covered by the chamfer. This offers the advantage that the ring part may be produced with less mass and can therefore be readily balanced.

According to an example embodiment of the present invention, in a planetary transmission motor, the rotor shaft of the electric motor driving the planetary transmission is inserted into an input shaft arranged as a hollow shaft, a ring part is slipped onto the hollow shaft, so that the shaft is connected to the hollow shaft with the aid of the ring part by a previously mentioned coupling.

This has the advantage that the clamping ring is able to be placed on the input side of the planetary transmission. As a result, a nonpositive coupling may be induced on the rapidly rotating side.

Further features and aspects of example embodiments of the present invention are described in greater detail below with reference to the appended Figures.

BRIEF DESCRIPTION OF THE DRAWINGS

FIG. 9 is an oblique view of a third clamping ring, which differs from the first clamping ring and the second clamping ring only by having a chamfer 100 that differs in its arrangement from conical chamfer 3.

FIG. 10 is a longitudinal cross-sectional view, associated with FIG. 9 and including the ring axis, through the third clamping ring.

DETAILED DESCRIPTION

Figure 1:
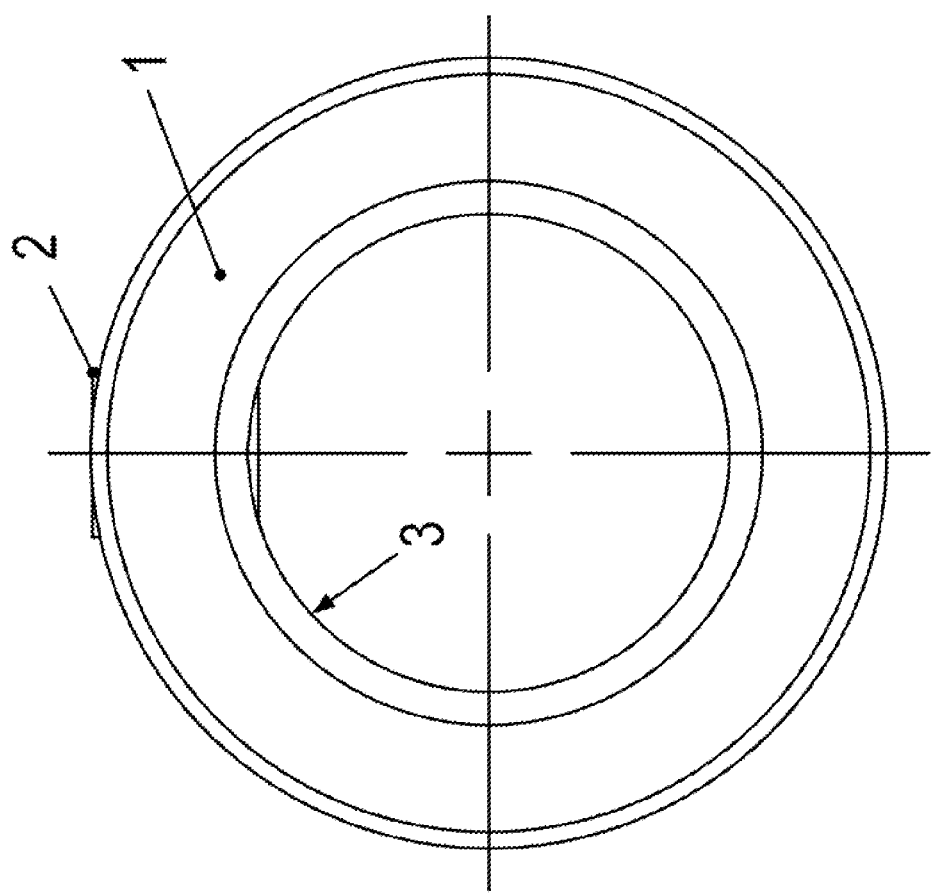
FIG. 1 is a side view of a first clamping ring of a coupling according to an example embodiment of the present invention, in particular a shaft-hub coupling, of a planetary transmission motor.
Figure 2:
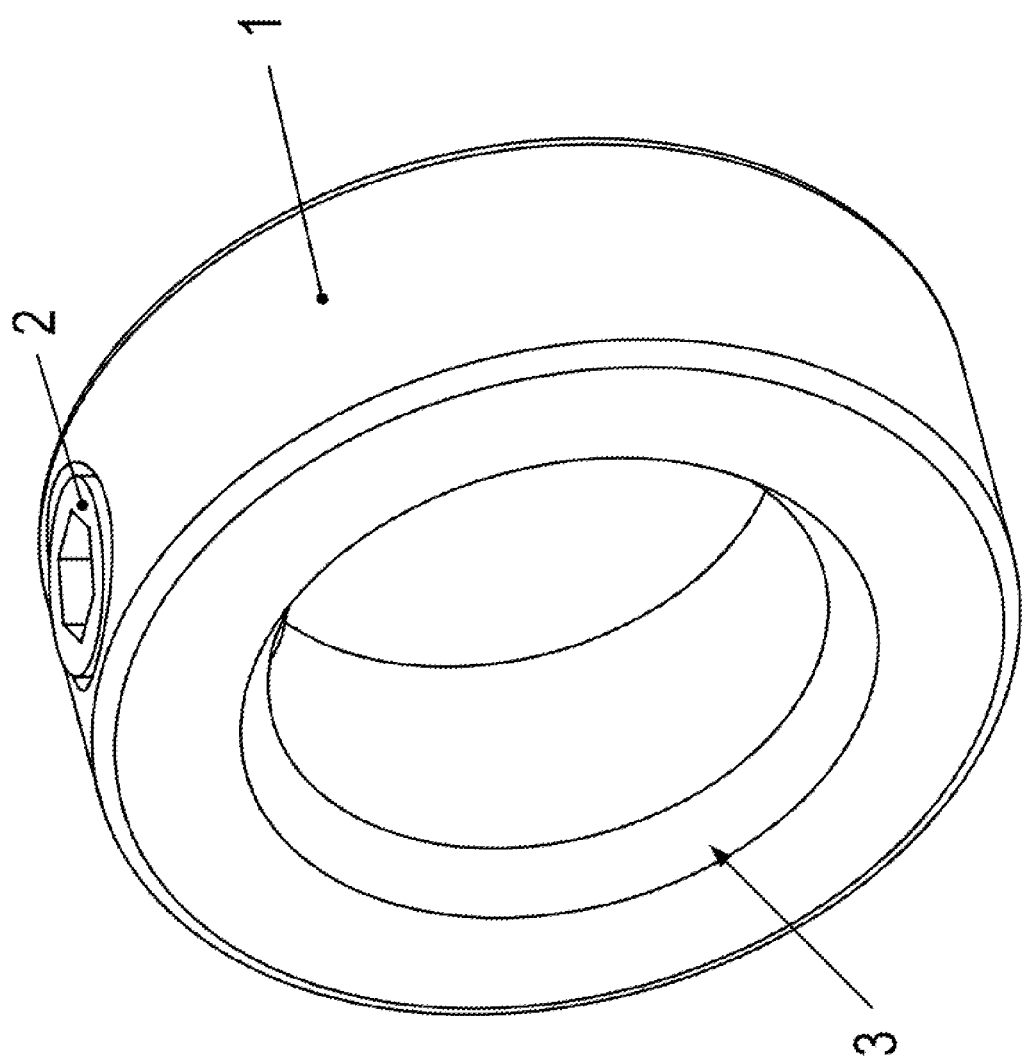
FIG. 2 is an associated oblique view.
Figure 3:
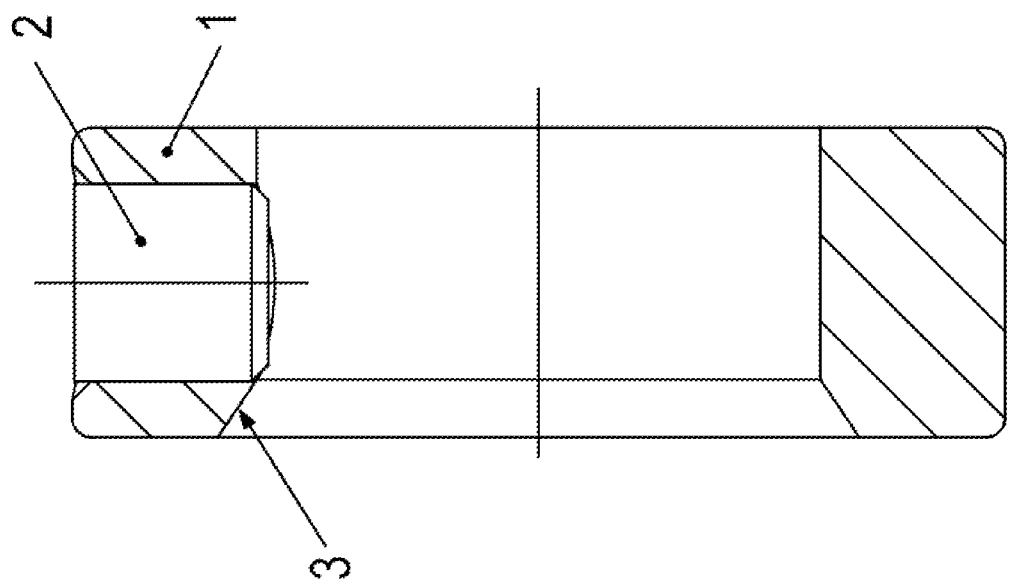
FIG. 3 is a longitudinal cross-sectional view, which includes the ring axis of the clamping ring, through the clamping ring.

As illustrated in FIG. 1 to FIG. 7, the clamping ring has a ring part 1 which is continuous in the circumferential direction.

A screw part 2 is screwed into a radially uninterrupted threaded bore of ring part 1 and exerts pressure on a flattened region 42 provided on hollow shaft 40. Flattened region 42 has a tangential orientation in this example.

Thus, hollow shaft 40 is pushed away from the threaded bore when screw part 2 is screwed into the threaded bore. In other words, hollow shaft 40 is pressed against ring part 1 in regions that are set apart from flattened region 42 in the circumferential direction. This makes it possible to shrink hollow shaft 40 onto the shaft inserted into hollow shaft 40.

At the outer circumference of hollow shaft 40, a collar 41 is premolded on hollow shaft 40 in an axial region. As a result, this collar 41, in particular a flange collar, is a radially projecting collar.

Ring part 1 rests against collar 41 and thus is axially restricted with respect to collar 41.

Ring part 1 is slipped onto hollow shaft 40 in the particular axial region that extends from collar 41 to the first axial end region.

Figure 4:
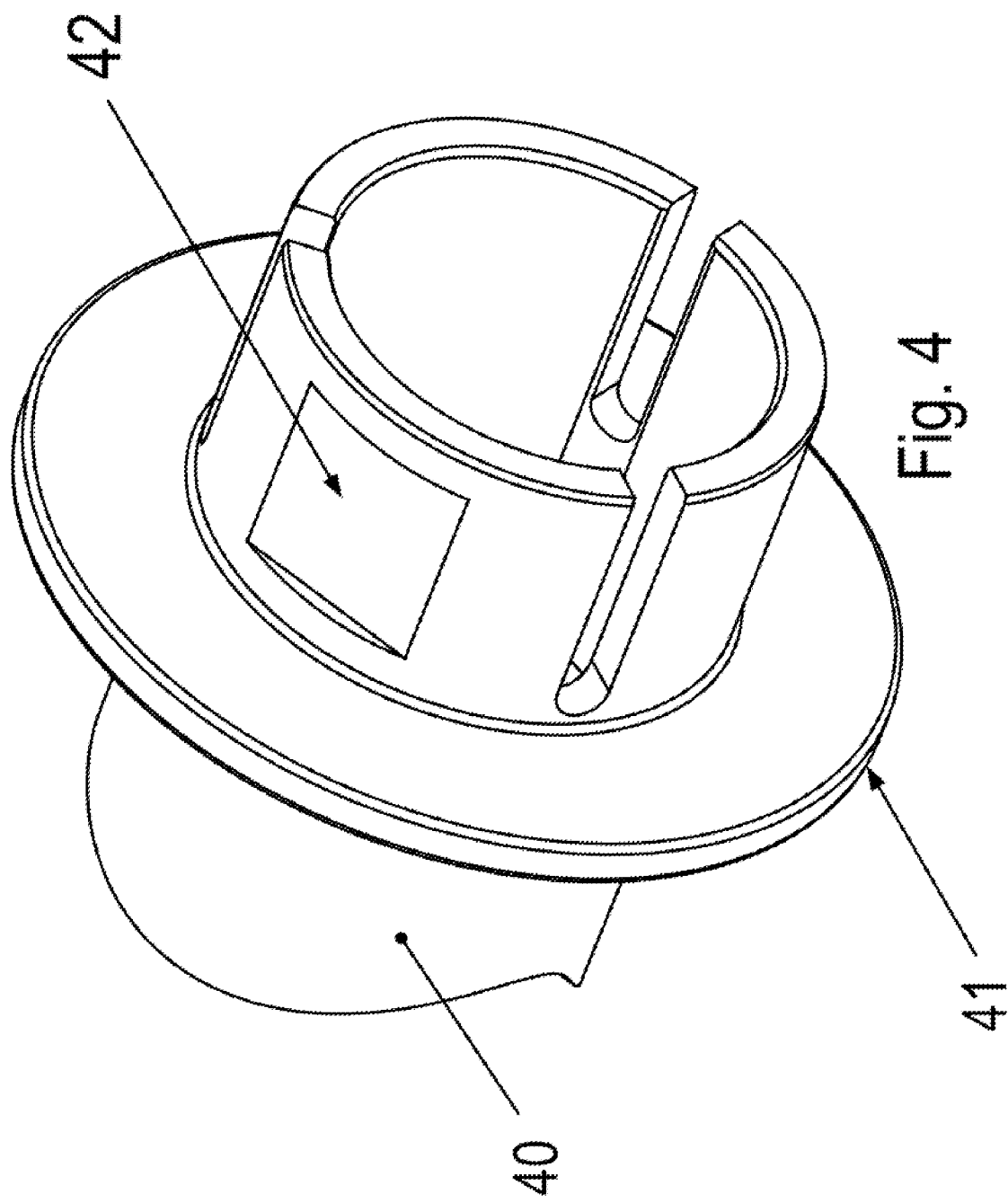
FIG. 4 is an oblique view of a region of a hollow shaft 40.
Figure 5:
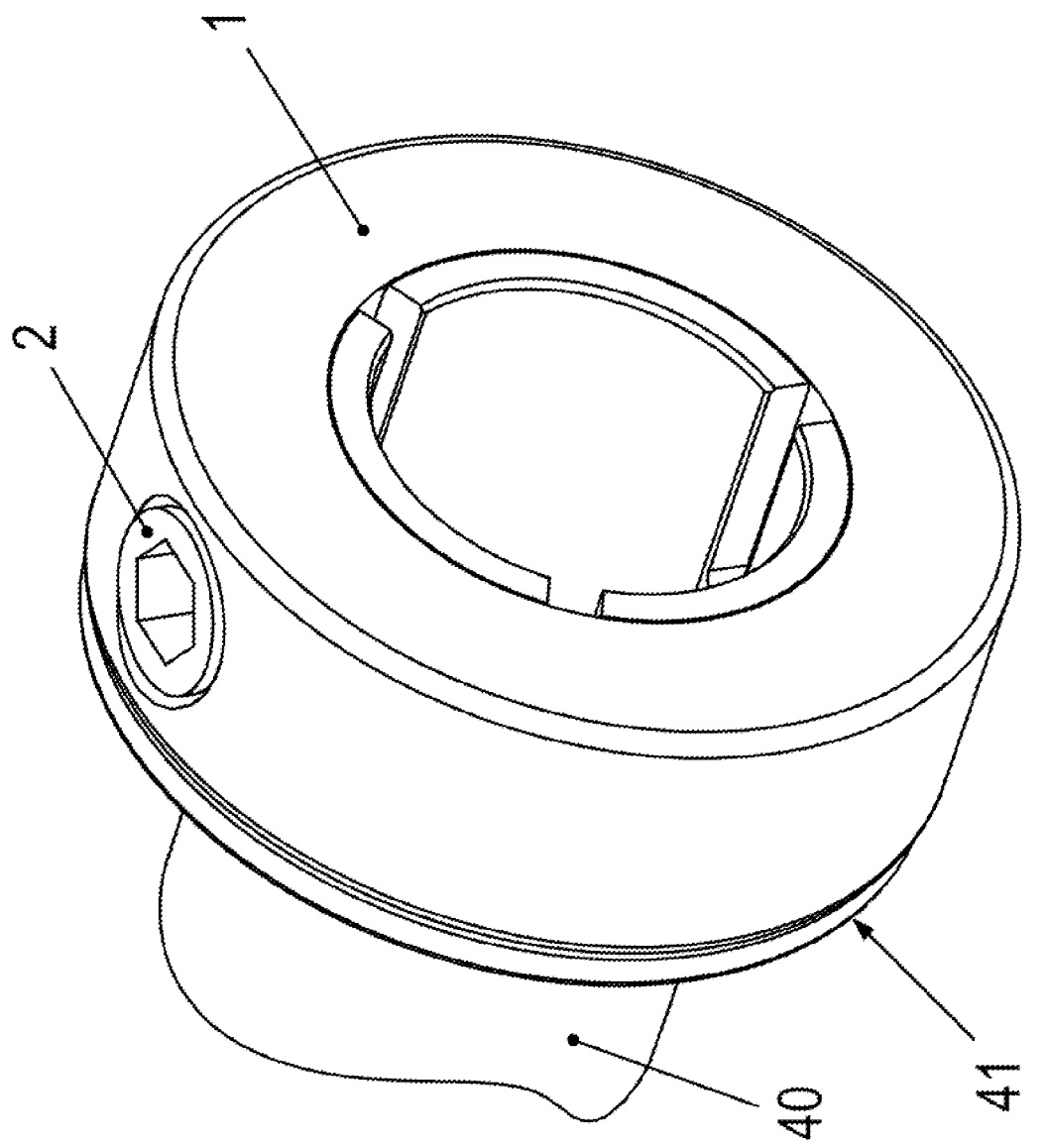
FIG. 5 is an oblique view of the clamping ring slipped onto hollow shaft 40.
Figure 6:
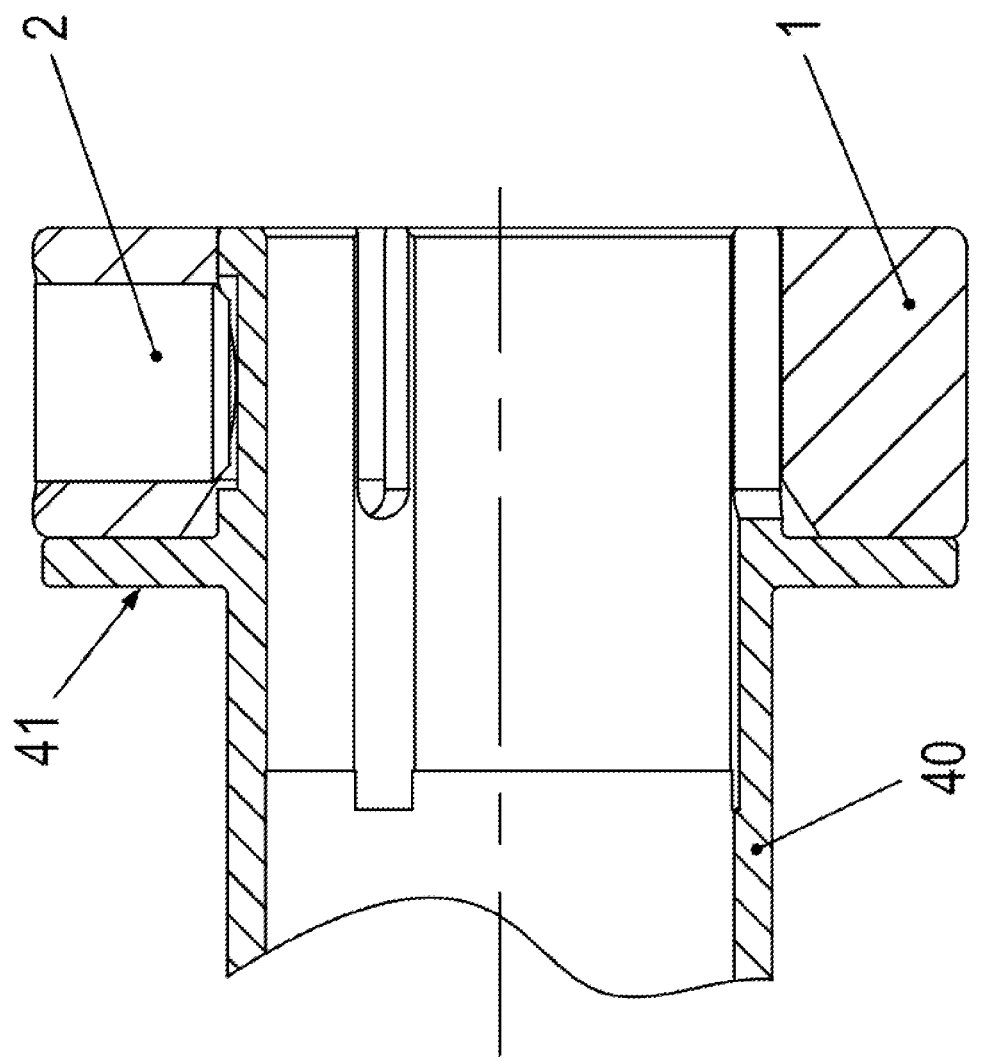
FIG. 6 is a longitudinal cross-sectional view that is associated with FIG. 5.

Hollow shaft 40 has axially oriented slots that radially extend through the wall. The slots are set apart from one another at regular intervals in the circumferential direction. In FIG. 4, three slots have been provided in this context, which have a circumferential angular spacing from one another of 120°.

The slots extend from the first axial end region of hollow shaft 40 to an axial position that has a non-vanishing distance from collar 41.

When screw part 2 is screwed into the threaded bore, then hollow shaft 40 is pushed away from the threaded bore of ring part 1, as described above. In other words, hollow shaft 40 is pressed against the inner wall of the ring part in the circumferential angular regions that are set apart in the circumferential direction. As a result, the three regions situated between the slots of hollow shaft 40 in the circumferential direction are radially compressed, i.e. pressed radially inward. Stated another way, hollow shaft 40 radially contracts and thus exerts pressure on the shaft which is inserted into hollow shaft 40.

Since the axially extending slots in hollow shaft 40 are set apart from the collar, hollow shaft 40 is deformed more heavily in the axial region covered by the slots than in the axial region situated between collar 41 and the axial region covered by the slots.

Ring part 1 has a conical chamfer 3, which is situated at the inner edge of ring part 1 facing collar 41 and hollow shaft 40. As a result, the shrink-fit effect in the axial region covered by the slots of hollow shaft 40 is undisturbed. This is so because ring part 1 does not touch hollow shaft 40 in the axial region between collar 41 and the axial region covered by the slots.

A free space between hollow shaft 40 and ring part 1 is therefore created with the aid of chamfer 3. When ring part 1 is shrunk onto hollow shaft 40, the pressure is therefore applied to the slotted axial region of hollow shaft 40 but not to the region without slots that particularly adjoins collar 41.

Ring part 1 has no balance bore situated opposite screw part 2.

Figure 7:
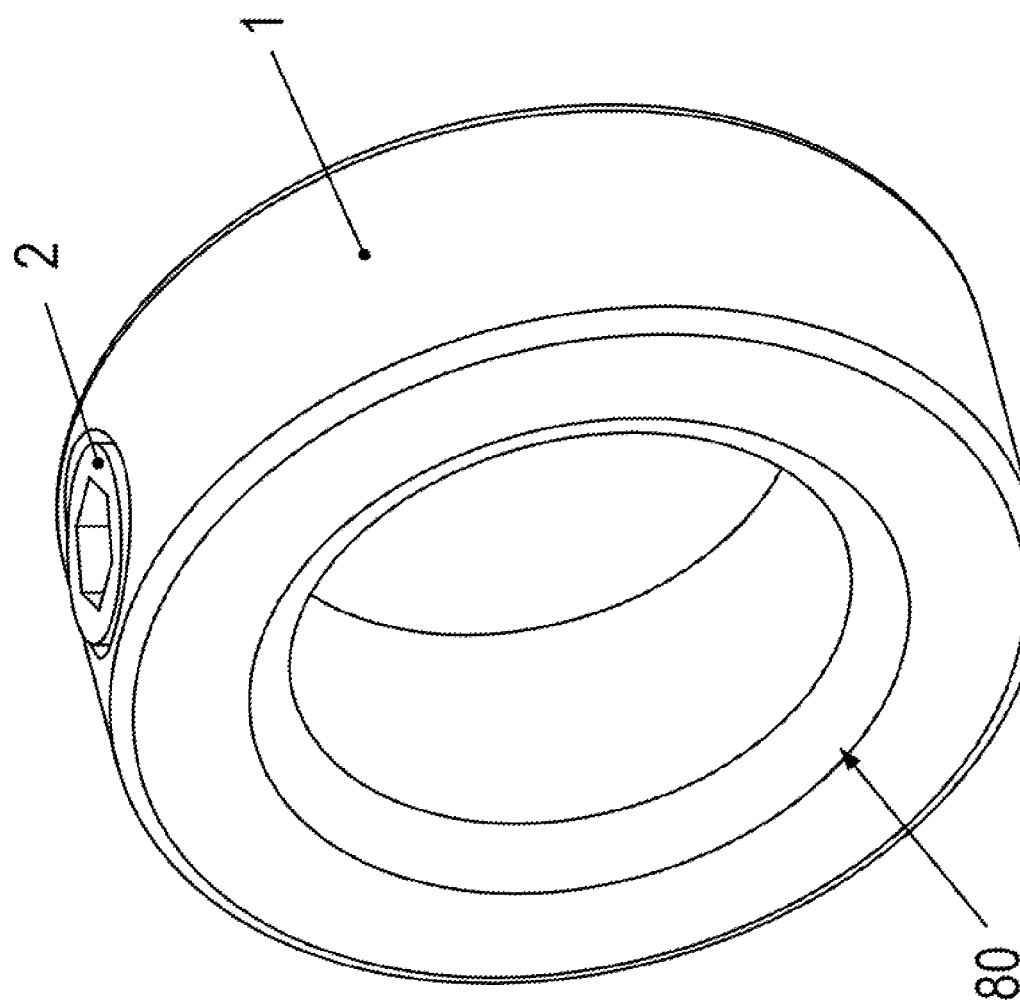
FIG. 7 is an oblique view of a second clamping ring, which differs from the first clamping ring only by having a chamfer 80 that differs in its arrangement from conical chamfer 3.
Figure 8:
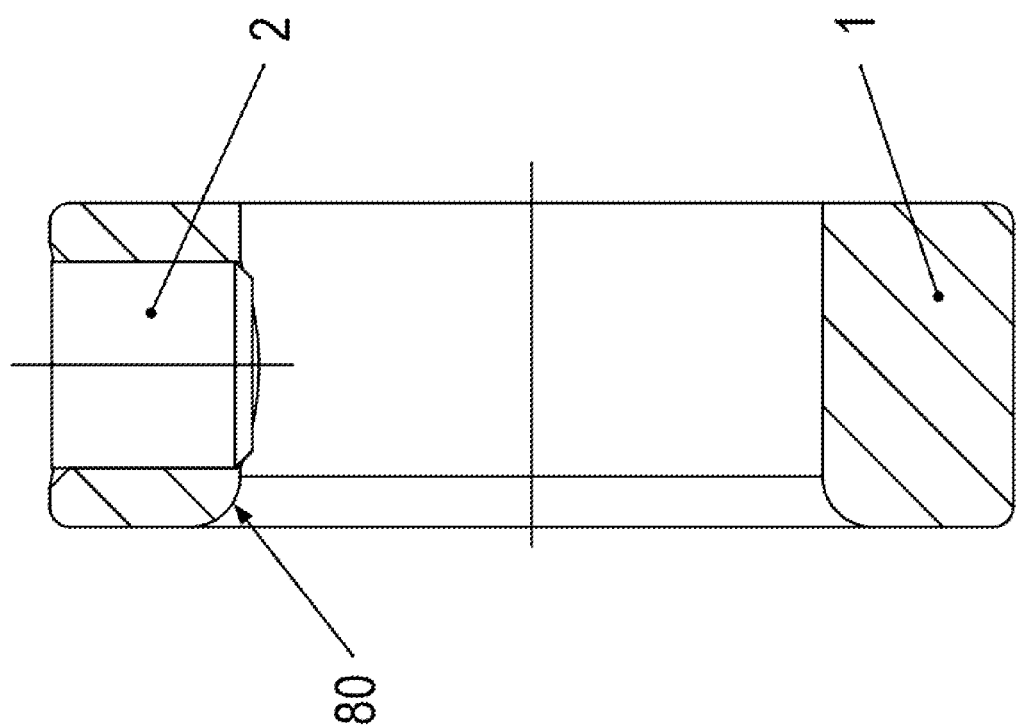
FIG. 8 is a longitudinal cross-sectional view, associated with FIG. 7 and including the ring axis, through the second clamping ring.

As illustrated in FIG. 8 and FIG. 7, in another exemplary embodiment according to the present invention, instead of conical chamfer 3, which has a straight section as a cross-section and is able to be produced by rotating this straight section about the ring axis of ring part 1, an arched conical chamfer 80 is provided, which is created by rotating an arched curve section. The arched curve section is either a segment of a circle, which results in an uncomplicated production, or a segment of an ellipsis so that greater stability is achieved in the transition region of ring part 1 to chamfer 80. In any case, chamfer 80 smoothly transitions to the region of ring part 1 that has the smallest inner diameter, i.e. contact region, with respect to hollow shaft 40.

As illustrated in FIG. 10 and FIG. 9, in another exemplary embodiment according to the present invention, instead of conical chamfer 3 of the first exemplary embodiment and instead of chamfer 80 of the second exemplary embodiment, a stepped chamfer 100 is implemented, i.e. one that includes a cylindrical step. As a result, ring part 1 has an in particular constant diameter in the axial region covered by stepped chamfer 100, which is larger than the smallest inner diameter of ring part 1. In this context it is important that the inner diameter provided in the axial region covered by stepped chamfer 100 differs from the smallest inner diameter of ring part 1 that it has in the contact region with hollow shaft 40, i.e. in the slotted region of hollow shaft 40.

LIST OF REFERENCE NUMERALS

1 ring part
2 screw part
3 conical chamfer
40 hollow shaft
41 collar, in particular flange collar
42 flattened region
80 arched conical chamfer
100 stepped chamfer

The invention claimed is:

1. A coupling, comprising:
a hollow shaft having a radially-projecting collar extending from an outer surface of the hollow shaft, the hollow shaft further comprising slots axially set apart from the collar;
a shaft at least partially extending into the hollow shaft; and
a ring part provided on the hollow shaft and including a chamfer on an axially inner surface thereof;
wherein the axially inner surface of the ring part is axially restricted by and rests against the collar;
wherein an inner diameter of the ring part in an axial region covered by the chamfer is greater than an inner diameter in an axial region in which the ring part is in contact with the hollow shaft; and
wherein the ring part includes a radially uninterrupted threaded bore into which a screw part is screwed and exerts pressure on the hollow shaft.

2. The coupling according to claim 1, wherein the ring part is arranged as a clamping ring.

3. The coupling according to claim 1, wherein the slots are arranged as axial slots.

4. The coupling according to claim 1, wherein the chamfer is arranged on an inner side of the ring part, at a ring opening of the ring part, and/or at an axial end region facing the collar.

5. The coupling according to claim 1, wherein a radial width of the ring part is independent of a circumferential angle.

6. The coupling according to claim 1, wherein the screw part exerts pressure on a flattened region of the hollow shaft and/or a planar region on an outer side of the hollow shaft.

7. The coupling according to claim 6, wherein the flattened region is arranged diametrically opposed to one of the slots and/or a center point of a circumferential angular range covered by the flattened region is arranged at a distance of 180° in a circumferential direction from a center point of a circumferential angular range covered by one of the slots.

8. The coupling according to claim 1, wherein an axial region of the shaft that is inserted into the hollow shaft at least overlaps with the axial region covered by the ring part.

9. The coupling according to claim 1, wherein the hollow shaft has a slotted region that includes the slots.

10. The coupling according to claim 1, wherein the slots of the hollow shaft are set apart from one another at regular intervals circumferentially.

11. The coupling according to claim 1, wherein the slots extend radially through the hollow shaft, extend radially through a wall of the hollow shaft, and/or have an axial alignment.

12. The coupling according to claim 1, wherein the hollow shaft includes at least three slots.

13. The coupling according to claim 1, wherein the hollow shaft has a constant outer diameter in the axial region covered by the ring part.

14. The coupling according to claim 1, wherein the axial region covered by the chamfer touches and/or adjoins the axial region covered by the collar.

15. The coupling according to claim 1, wherein a wall thickness and/or a cross-section of the ring part is independent of circumferential angle.

16. The coupling according to claim 1, wherein the chamfer is arranged as a conical chamfer, an arched conical chamfer, and/or a stepped chamfer.

17. The coupling according to claim 1, wherein the ring part is set apart from the hollow shaft in the axial region covered by the chamfer and/or the axial region covered by the chamfer adjoins the slotted region of the hollow shaft so that a compression force of the ring part is imparted on the slotted region of the hollow shaft but not on the axial region covered by the chamfer.

18. The coupling according to claim 1, wherein the collar is arranged at an axial distance from an axial end of the hollow shaft.

19. The coupling according to claim 18, wherein the chamfer is arranged on an axial side of the ring part facing the collar.

20. The coupling according to claim 19, wherein the chamfer is arranged on an axial side of the ring part opposite an axial side of the ring part facing the axial end of the hollow shaft.

21. The coupling according to claim 18, wherein an axial length of the slots from the axial end of the hollow shaft is less than the axial distance between the collar and the axial end of the hollow shaft.

22. The coupling according to claim 1, wherein the chamfer is arranged as a conical chamfer and/or an arched conical chamfer.

23. A planetary transmission motor, comprising:
a hollow input shaft having a radially-projecting collar extending from an outer surface of the hollow shaft, the hollow shaft further comprising slots axially set apart from the collar,
an electric motor having a rotor shaft at least partially extending into the hollow input shaft;
a coupling, the hollow input shaft and the rotor shaft being connected by the coupling, the coupling including a ring part provided on the hollow input shaft, the ring part including a chamfer on an axially inner surface thereof;
wherein the axially inner surface of the ring part is axially restricted by and rests against the collar;
wherein an inner diameter of the ring part in an axial region covered by the chamfer is greater than an inner diameter in an axial region in which the ring part is in contact with the hollow input shaft; and wherein the ring part includes a radially uninterrupted threaded bore into which a screw part is screwed and exerts pressure on the hollow input shaft.

* * * * *